M. MANLOVE.
HAY RAKERS AND COCKERS.

No. 182,586.          Patented Sept. 26, 1876.

WITNESSES:
C. Neveux
John Goethals

INVENTOR:
M. Manlove
BY
[signature]
ATTORNEYS.

UNITED STATES PATENT OFFICE.

MOSES MANLOVE, OF MUSCODA, WISCONSIN.

IMPROVEMENT IN HAY RAKERS AND COCKERS.

Specification forming part of Letters Patent No. 182,586, dated September 26, 1876; application filed July 11, 1876.

*To all whom it may concern:*

Figure 1:
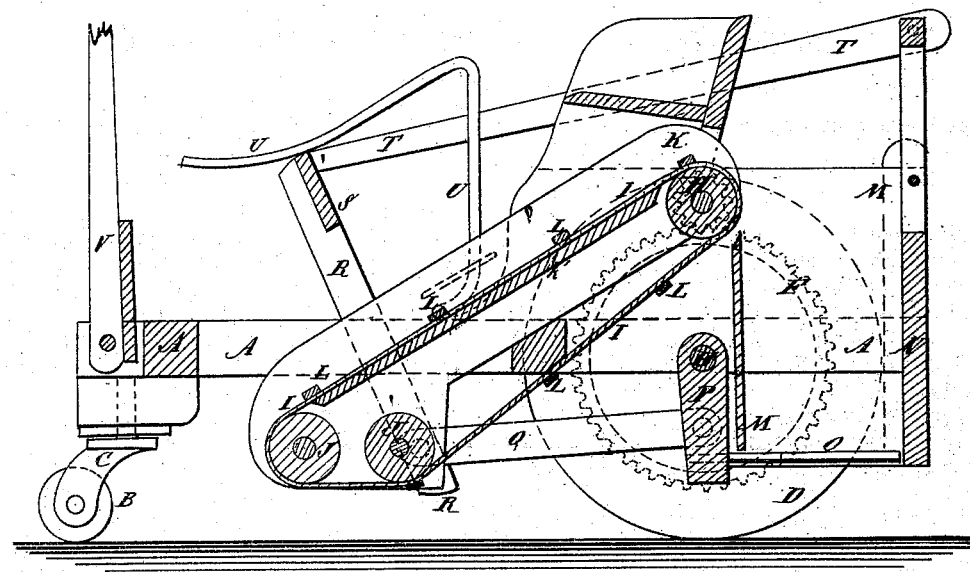
Figure 2:
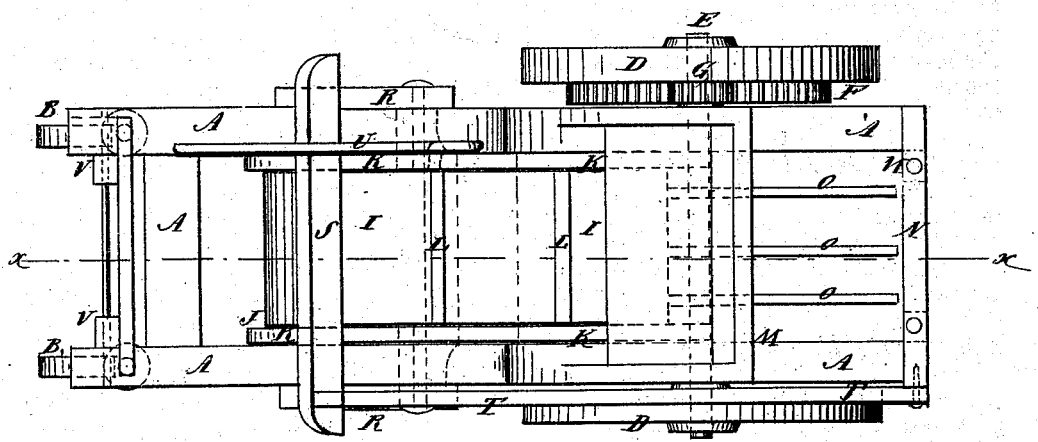

Be it known that I, MOSES MANLOVE, of Muscoda, in the county of Grant and State of Wisconsin, have invented a new and useful Improvement in Machine for Raking and Cocking Hay, of which the following is a specification:

Figure 1 is a vertical longitudinal section of my improved machine, taken through the line $x\ x$, Fig. 2. Fig. 2 is a top view of the same.

Similar letters of reference indicate corresponding parts.

The object of this invention is to furnish an improved machine which shall be so constructed as to collect the hay and deposit it upon the ground in cocks, and which shall be simple in construction, easily operated, and reliable in use.

The invention consists in the combination of the swinging back, the drop-bottom, the connecting-bars, the levers and cross-bar, and the lever, with the frame and the box that receives the hay from the elevator; and in the combination of the bent rod with the swinging elevator and the cross-bar of the front levers, as hereinafter fully described.

A is the frame of the machine, the forward end of which is supported by two small caster-wheels, B, the standards C of which are pivoted to the corners of said frame A. The rear end of the machine is supported by the drive-wheels D, which revolve upon the journals of the axle E attached to the rear part of the frame A. To one of the wheels D is attached a large gear-wheel, F, into the teeth of which mesh the teeth of a small gear-wheel, G, attached to the journal of the roller H. The roller H revolves in bearings in the upper part of the frame A, and around which passes the endless belt I. The belt I also passes around the two parallel rollers J, which are pivoted to the lower part of the elevator-frame K, in such positions that they will both be at the same distance from the ground when at work. The upper end of the elevator-frame K is hung upon the journals of the roller H. The upper part of the ·· ˈless belt I is kept from sagging by a bottom, $k'$, attached to the frame K. To the belt I are attached cross-bars L, which should be provided with teeth inclined forward, and by which the hay is taken from the ground, carried up the said elevator to its upper end, and is dropped into the box M formed in the rear end of the machine, and made of such a size as to contain enough hay for a cock.

The rear side N of the box M is pivoted at its upper part to the posts or sides of the said box M, so that its lower part may swing out, to allow the collected hay to pass out of the box. The bottom O of the box M is formed of slats, the rear ends of which are attached to the lower part of a block, P, the upper edge of which is pivoted to the axle E, so that the rear part of said bottom O may drop down, to allow the hay to slide to the ground. To the lower part of the ends of the swinging block P are pivoted the rear ends of two connecting-bars, Q, the forward ends of which are pivoted to the lower ends of two levers, R, which are pivoted to the side bars of the frame A, and the upper ends of which are connected by a cross-bar, S.

T is a lever, the rear end of which is pivoted to the upper end of the door N or to an arm rigidly attached to said door. The lever T is made of such a length that when the forward end of said lever rests against the cross-bar S of the levers R, both the door N and bottom O will be locked shut.

By this construction, when enough hay has been collected for a cock, the forward end of the lever T is raised, and the weight of the hay forces the bottom O and the door N open, and leaves the cock stand upon the ground. The elevator is kept from dropping down too low by resting upon a cross-bar of the frame A.

To the elevator-frame K is pivoted a bent rod, U, which passes over the cross-bar S of the levers R, so that by pushing the said rod forward the lower end of the elevator will be raised from the ground.

V are the thills, which are attached to the forward end of the frame A.

Having thus described my invention, I claim as new and desire to secure by Letters Patent—

1. The combination of the swinging back N, the drop-bottom O P, the connecting-bars Q, the levers and cross-bar R S, and the lever T, with the frame A and the box M that receives the hay from the elevator, substantially as herein shown and described.

2. The combination of the bent rod U with the swinging elevator H I J K L and the cross-bar S of the levers R, substantially as herein shown and described.

MOSES MANLOVE.

Witnesses:
  A. R. TYLER,
  JOHN SMALLEY.